Patented Oct. 15, 1929

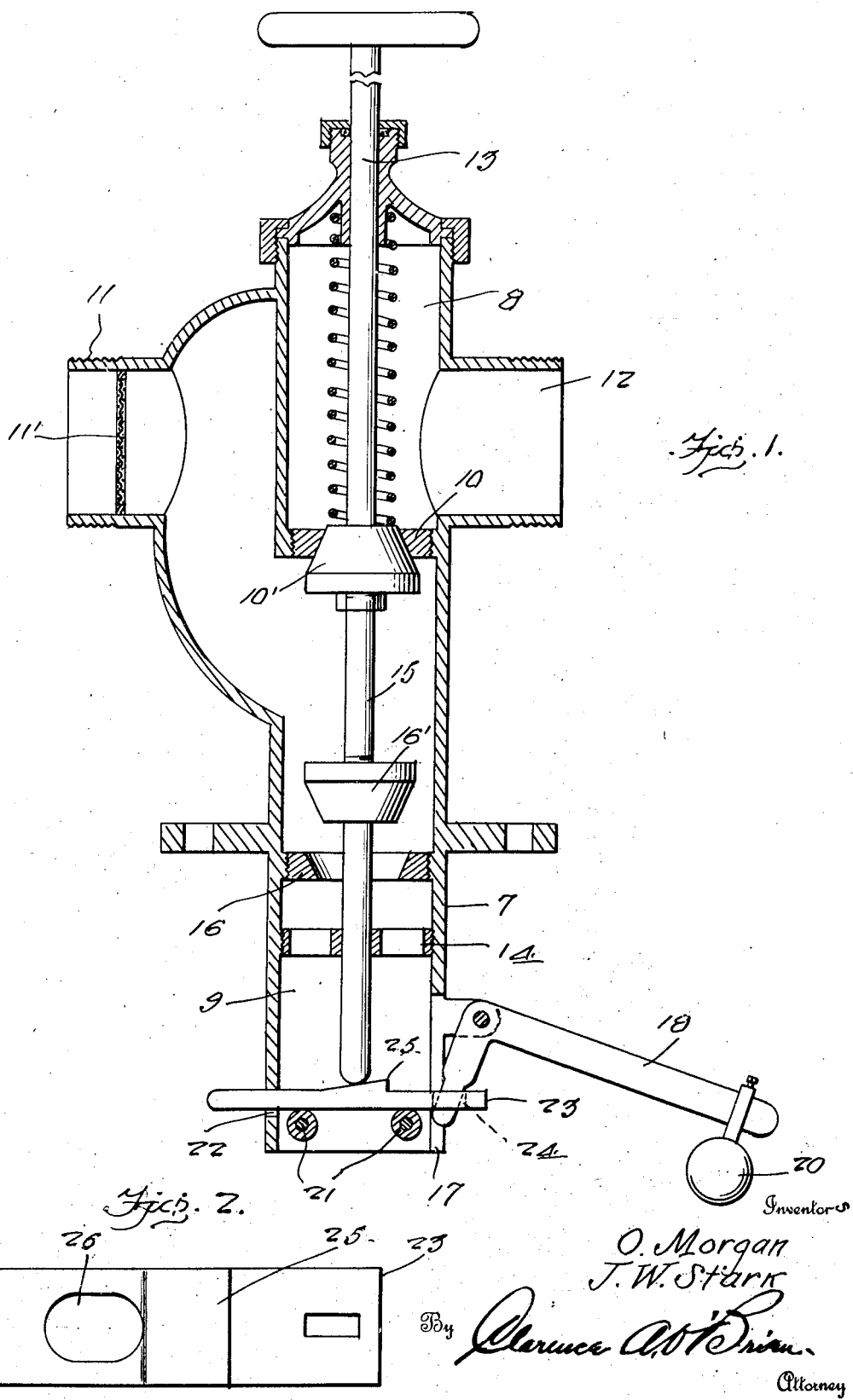

1,732,107

UNITED STATES PATENT OFFICE

OLIVER MORGAN AND JOHN W. STARK, OF WEWOKA, OKLAHOMA

VALVE FOR OIL-DISTRIBUTING SYSTEMS

Application filed October 20, 1928. Serial No. 313,802.

This invention relates to new and useful improvements in valves for oil distributing systems, and has for its primary object the provision of a valve unit embodying certain improvements over the valve shown and described in our application Serial No. 259,514 filed March 6, 1928.

Generally the valve set up herein is the same as the valve shown and described in said pending application. However, in the present instance, means is provided for locking the valve stem in lowered position against the action of the oil within the oil tank, and also to prevent the accidental downward movement of the valve stem by any means other than the predetermined high level of the oil within the tank. The structure is such to prevent the valve stem being accidentally tripped by outside interference, and this even though any object should fall upon the stem at the outside of the oil tank or by any vibration caused by one walking upon the deck of the tank. Obviously therefore the stem can only be tripped by the high level of the oil within the tank to close the flow of the oil to that particular tank.

In the drawing wherein like reference characters indicate corresponding parts throughout both of the views:

Figure 1 is a detail longitudinal section through my improved valve, the valve stem being illustrated as in raised position to permit the flow of the oil into the tank within which it is associated, but to cut off the supply of the oil to the next adjacent tank, and Figure 2 is a plan view of the sliding trip plate per se.

Now having particular reference to the drawing, the valve illustrated therein is substantially the same as the valve shown and described in our previous application, that is the valve consist of a somewhat elongated cylindrical body 7 constructed to provide an upper and lower chamber 8 and 9, which communicates through a renewable valve seat ring 10. The lower chamber 9 is equipped at its upper end with the usual inlet nipple 11 within which in the present instance is a strainer screen 11'. The upper chamber is equipped with an outlet nipple 12, and in this instance also the upper end of the chamber 8 is provided with a closure 13. Slidable through the closure and through a removable spider 14 in the lower chamber is a valve stem 15 movable within the lower chamber through a renewable valve seat ring 16 above the spider 14. Between these valve seat rings the said stem 15 is equipped as in other applications with a pair of spaced valve plugs 10' and 16', respectively. In this instance also the lower end of the body 7 is provided with a longitudinal slot 17, while pivoted to the body adjacent the upper end thereof is the short end of a bell crank 18, the outer end of which is equipped with an adjustable float 20. In this instance the lower end of the body 7 is provided with a pair of horizontally arranged rollers 21—21 that extend at right angles to the slots 17, the wall of the body opposed to said slots 17 directly above the rollers being provided with a slot 22. Slidably resting upon these rollers and projecting at its opposite ends to the slots 17 and 22 is a sliding trip plate 23 provided at its end adjacent the slot 17 with an opening 24 for receiving the lower end of the short arm of said bell crank 18. Intermediate the rollers 21—21 the sliding trip plate 23 is formed to provide an inclined surface 25 upon which the lower end of the stem 15 rests, said stem in this instance also being normally urged downwardly through the medium of a coil spring 21ª. At the low point of this inclined surface 25 the trip plate is provided with an opening 26, and as soon as the plate 23 is moved to the right by the action of the float controlled bell crank 18 the stem 15 will project through the opening 26, and regardless of the level of the oil within the tank the stem cannot be raised other than by one drawing upwardly upon the same exteriorly of the tank. Also, by reason of the inclined supporting surface for the lower end of the stem 15 there will be no possibility of the stem tripping until the plate 23 is forcibly moved over by the action of the float controlled lever 18 when the fluid in the tank rises to a predetermined high level.

In view of the foregoing description when considered in conjunction with the accompanying drawing it will be apparent that we have provided a novel, simple and efficient valve for use in oil distributing systems that is well adapted for all the purposes heretofore designated, even though we have herein shown and described the invention as consisting of certain detail structural elements it is nevertheless to be understood that some changes may be made therein without affecting the spirit and scope of the appended claim.

Having thus described the invention, what we claim as new and desire to secure by Letters Patents is:—

In a valve of the character described, a body member having an inlet passage and a pair of outlet passages, valve seats within said passages, a valve stem movable through the body member and having valve heads for alternate engagement with said seats for alternate opening and closing of the outlet passages, means normally urging the stem in one direction, a sliding member associated with the body at one end of the stem, and against which this end of the stem is normally contacting by reason of said means, fluid control means for sliding the plate in one direction, said plate being provided with an opening through which the adjacent end of the stem will be projected when the plate is automatically moved in that direction.

In testimony whereof we affix our signatures.

OLIVER MORGAN.
JOHN W. STARK.